United States Patent
Morimura

(10) Patent No.: US 12,076,852 B2
(45) Date of Patent: Sep. 3, 2024

(54) GRIPPER DEVICE

(71) Applicant: OKUMA Corporation, Aichi (JP)

(72) Inventor: Shoichi Morimura, Aichi (JP)

(73) Assignee: OKUMA CORPORATION, Aichi (JP)

( * ) Notice: Subject to any disclaimer, the term of this patent is extended or adjusted under 35 U.S.C. 154(b) by 728 days.

(21) Appl. No.: 17/338,221

(22) Filed: Jun. 3, 2021

(65) Prior Publication Data

US 2021/0379772 A1    Dec. 9, 2021

(30) Foreign Application Priority Data

Jun. 5, 2020 (JP) ................................ 2020-098561

(51) Int. Cl.
 *B25J 15/08* (2006.01)
 *B25J 15/00* (2006.01)
 *B25J 15/10* (2006.01)

(52) U.S. Cl.
 CPC ......... *B25J 15/086* (2013.01); *B25J 15/0028* (2013.01); *B25J 15/10* (2013.01)

(58) Field of Classification Search
 CPC .... B25J 15/086; B25J 15/026; B25J 15/0293; B25J 15/10; B25J 15/106
 See application file for complete search history.

(56) References Cited

U.S. PATENT DOCUMENTS

| | | | | |
|---|---|---|---|---|
| 4,865,301 A * | 9/1989 | Ise | ........................ | B23Q 7/043 269/34 |
| 8,905,452 B2 * | 12/2014 | Williams | .................. | B25B 1/06 294/207 |
| 9,616,581 B1 * | 4/2017 | Lafleur | .................. | B25J 15/086 |
| 10,434,662 B2 * | 10/2019 | Jalenques | .............. | B25J 15/086 |
| 2010/0131100 A1 * | 5/2010 | Takano | .................... | B25J 13/08 700/258 |
| 2014/0094104 A1 | 4/2014 | Manhire et al. | | |
| 2015/0075935 A1 | 3/2015 | Kitayama et al. | | |

FOREIGN PATENT DOCUMENTS

| | | | | |
|---|---|---|---|---|
| EP | 0205141 A2 | 12/1986 | | |
| GB | 2119894 A | * 11/1983 | ............ | B25J 15/026 |
| JP | S5220666 U | 2/1977 | | |
| JP | S5969887 U | 5/1984 | | |

(Continued)

OTHER PUBLICATIONS

JPO Notice of Reasons for Refusal for corresponding JP Application No. 2020-098561; Mailing Date, Sep. 19, 2023.

*Primary Examiner* — Dean J Kramer
(74) *Attorney, Agent, or Firm* — CANTOR COLBURN LLP

(57) ABSTRACT

A gripper device includes a plurality of gripper claws, a plurality of linear motion units, each of which is disposed on corresponding one of the plurality of gripper claws, a synchronization mechanism configured to synchronize movement of the plurality of linear motion units, a first cylinder configured to apply a driving force thereof to the linear motion unit or the synchronization mechanism, a second cylinder having a shorter stroke and a greater driving force as compared to those of the first cylinder, and a transmission mechanism having a clutch which is configured to establish or release mechanical connection between the second cylinder and the synchronization mechanism.

9 Claims, 16 Drawing Sheets

(56) References Cited

FOREIGN PATENT DOCUMENTS

| | | |
|---|---|---|
| JP | S62074544 A | 4/1987 |
| JP | H023389 U | 1/1990 |
| JP | H0560787 U | 8/1993 |
| JP | H0796484 A | 4/1995 |
| JP | H08025271 A | 1/1996 |
| JP | 2001165199 A | 6/2001 |
| JP | 2014009721 A | 1/2014 |
| JP | 2015535776 A | 12/2015 |
| JP | 2019076973 A | 5/2019 |
| JP | 2021088053 A | 6/2021 |
| WO | 2014083430 A1 | 6/2014 |

\* cited by examiner

GRIPPER DEVICE

CROSS REFERENCE TO RELATED APPLICATION

This present invention claims priority under 35 U.S.C. § 119 to Japanese Patent Application No 2020-098561 filed on Jun. 5, 2020, the entire content of which is incorporated herein by reference.

TECHNICAL FIELD

The present disclosure discloses a gripper device which is actuated hydraulically or pneumatically.

BACKGROUND

Conventionally, gripper devices have been broadly known as devices for gripping an object. A gripper device has a plurality of gripper claws that approach toward or are separated from each other to thereby grip or release the object. Such a gripper device is typically used as an end effector of a robot, for example.

As one of the gripper devices, a hydraulically or pneumatically driven gripper device (see, for example, JP H07-96484 A) has been known. In this device, gripper claws are advanced or retreated by means of a hydraulically or pneumatically actuated cylinder.

CITATION LIST

Patent Literature

Patent Document 1: JP H07-96484 A
Patent Document 2: JP 2019-76973 A

In general, the gripper devices are expected to hold objects which are heavy and have different sizes. To achieve this, it is desired that both the gripping force and the stroke of the gripper devices are great. For a gripper device incorporating as its driving source a hydraulic or pneumatic cylinder, the stroke of the gripper device depends on the length of the cylinder, while the gripping force of the gripper device depends on the area of a pressure-receiving surface of the cylinder. Here, when the volume of the cylinder is constant, as the area of the pressure-receiving surface is increased, the stroke is accordingly decreased. In other words, for a cylinder whose volume is unchanged, an increase in the gripping force of the gripper device results in a decrease in the stroke thereof, whereas an increase in the stroke results in a decrease in the gripping force. Therefore, there has been a tradeoff between increasing the gripping force and increasing the stroke in the gripper device. Both the gripping force and the stroke can be simultaneously increased, of course, by increasing the volume of the cylinder. In this case, however, the entire gripper device will be upsized and increased in weight.

In view of the circumstances, the present disclosure discloses a gripper device in which both a gripping force and a stroke can be increased while circumventing upsizing of the gripper device.

SUMMARY

In one aspect of the present disclosure, a gripper device includes a plurality of gripper claws configured to be interlockingly movable with respect to each other, a plurality of linear motion units disposed on the plurality of gripper claws in such a manner that each of the plurality of linear motion units is associated with a corresponding one of the plurality of gripper claws, a synchronization mechanism configured to synchronize movement of the plurality of linear motion units, a first cylinder which is linearly extended and retracted by oil pressure or air pressure to apply a driving force of the first cylinder to the linear motion unit or the synchronization mechanism, a second cylinder which is linearly extended and retreated by oil pressure or air pressure, and has a stroke shorter than a stroke of the first cylinder and a driving force greater than the driving force of the first cylinder, and a transmission mechanism including a clutch configured to establish and release mechanical connection between the second cylinder and the synchronization mechanism.

In the gripper device according to the above aspect, the linear motion unit may include a linearly moving body which is mechanically coupled to a corresponding one of the gripper claws, and the synchronization mechanism may include at least one claw rack disposed on the linearly moving body and at least one synchronization gear configured to engage the at least one claw rack.

In another aspect of the disclosure, the transmission mechanism and the synchronization mechanism may be configured to amplify the driving force of the second cylinder and transmit the amplified driving force to the linear motion unit.

In another aspect of the disclosure, the clutch may be a one-way clutch which is configured to engage the second cylinder with the synchronization mechanism to transmit the driving force of the second cylinder to the synchronization mechanism when the second cylinder is actuated to move linearly along a first direction, and disengage the second cylinder from the synchronization mechanism when the second cylinder is actuated to move linearly along a second direction that is opposite the first direction.

In the gripper device according to the above aspect, the transmission mechanism may include a cam-type one-way clutch including an outer wheel which is always coupled to the second cylinder and configured to be rotated by an extending or retreating motion of the second cylinder, a pocket defined in an axial end surface of the outer wheel, the pocket having a peripheral surface designed to function as a cam surface, an inner wheel which is always coupled to the synchronization mechanism and concentrically placed within the outer wheel in the pocket, a relay roller which is disposed between the cam surface and the inner wheel and configured to be established in an engaged state where the relay roller is brought into intimate contact with both the cam surface and the inner wheel when the outer wheel is rotated along a first rotational direction and to be established in a disengaged state where the relay roller is separated from at least one of the cam surface and the outer wheel when the outer wheel is rotated along a second rotational direction that is opposite the first rotational direction, and an urging member configured to urge the relay roller toward the engaged state.

In another aspect of the disclosure, the transmission mechanism may include a cam-type one-way clutch including an inner wheel which is always coupled to the second cylinder and configured to be rotated by an extending or retreating motion of the second cylinder, a pocket which is defined in an axial end surface of the inner wheel and has a peripheral surface designed to function as a cam surface, an outer wheel which is always connected to the synchronization mechanism and concentrically placed around the inner wheel, a relay roller which is disposed between the cam surface and the outer wheel and configured to be established in an engaged state where the relay roller is brought into intimate contact with both the cam surface and the outer wheel when the inner wheel is rotated along a first rotational direction and to be established in a disengaged state where the relay roller is separated from at least one of the cam surface and the outer wheel when the inner wheel is rotated along a second rotation direction that is opposite the first rotation direction, and an urging member configured to urge the relay roller toward the engaged state.

In another aspect of the disclosure, the transmission mechanism may include a ratchet-type one-way clutch including a lever which is always coupled to the second cylinder and configured to be swung by an extending or retreating motion of the second cylinder, a ratchet pawl which is coupled to the lever and configured to pivot in response to a swinging motion of the lever, and a ratchet gear which is always coupled to the synchronization mechanism for interlocked movement with the synchronization mechanism and configured to be rotated when the ratchet pawl is pivoted along a first pivot direction and not to be rotated when the ratchet pawl is pivoted along a second pivot direction that is opposite the first pivot direction.

In another aspect of the disclosure, the transmission mechanism may include a dog clutch including an output wheel which is always coupled to the synchronization mechanism for interlocked movement with the synchronization mechanism, an input wheel which is always coupled to the second cylinder and configured to be rotated by an extending or retreating motion of the second cylinder, the input wheel which is axially advanced to engage at least a part of the output wheel in a circumferential direction thereof, and an actuator which is configured to axially advance or retreat the input wheel.

In another aspect of the disclosure, the plurality of gripper claws may comprise N gripper claws where N≥3, the N gripper claws being configured to be movable toward or away from each other along mutually different sides of a polygon composed of N sides, each of the linear motion units may include a linearly moving body which is mechanically coupled to a corresponding one of the N gripper claws, and the synchronization mechanism may include a craw rack disposed on the linearly moving body, in which the synchronization mechanism includes N claw racks, and a first synchronization gear disposed at a center of the polygon and configured to be directly or indirectly engaged with all of the N claw racks at the same time.

In the gripper device disclosed herein, both the gripping force and the stroke can be increased without upsizing the gripper device.

BRIEF DESCRIPTION OF DRAWINGS

Embodiments of the present disclosure will be described based on the following figures, wherein.

DESCRIPTION OF EMBODIMENTS

Figure 1:
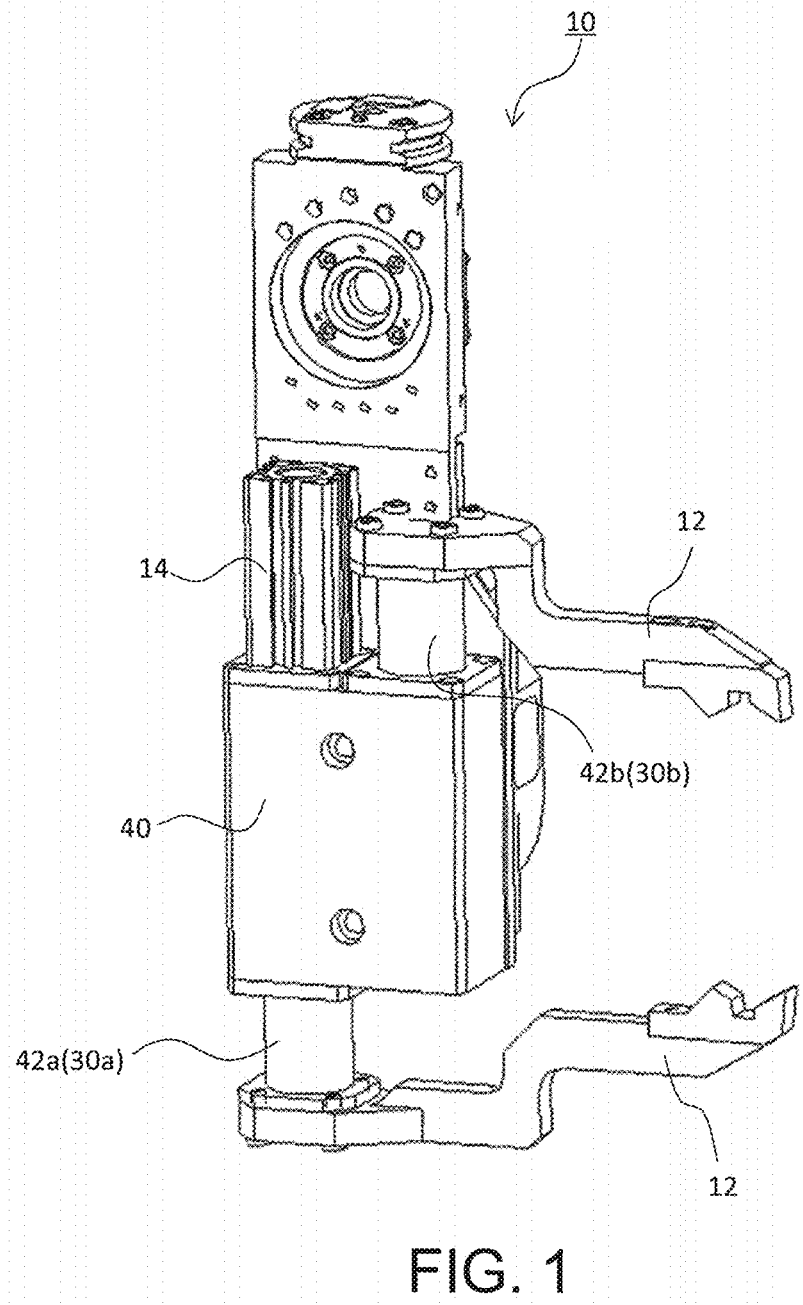
FIG. 1 is a perspective view of a gripper device as viewed from the front.
Figure 2:
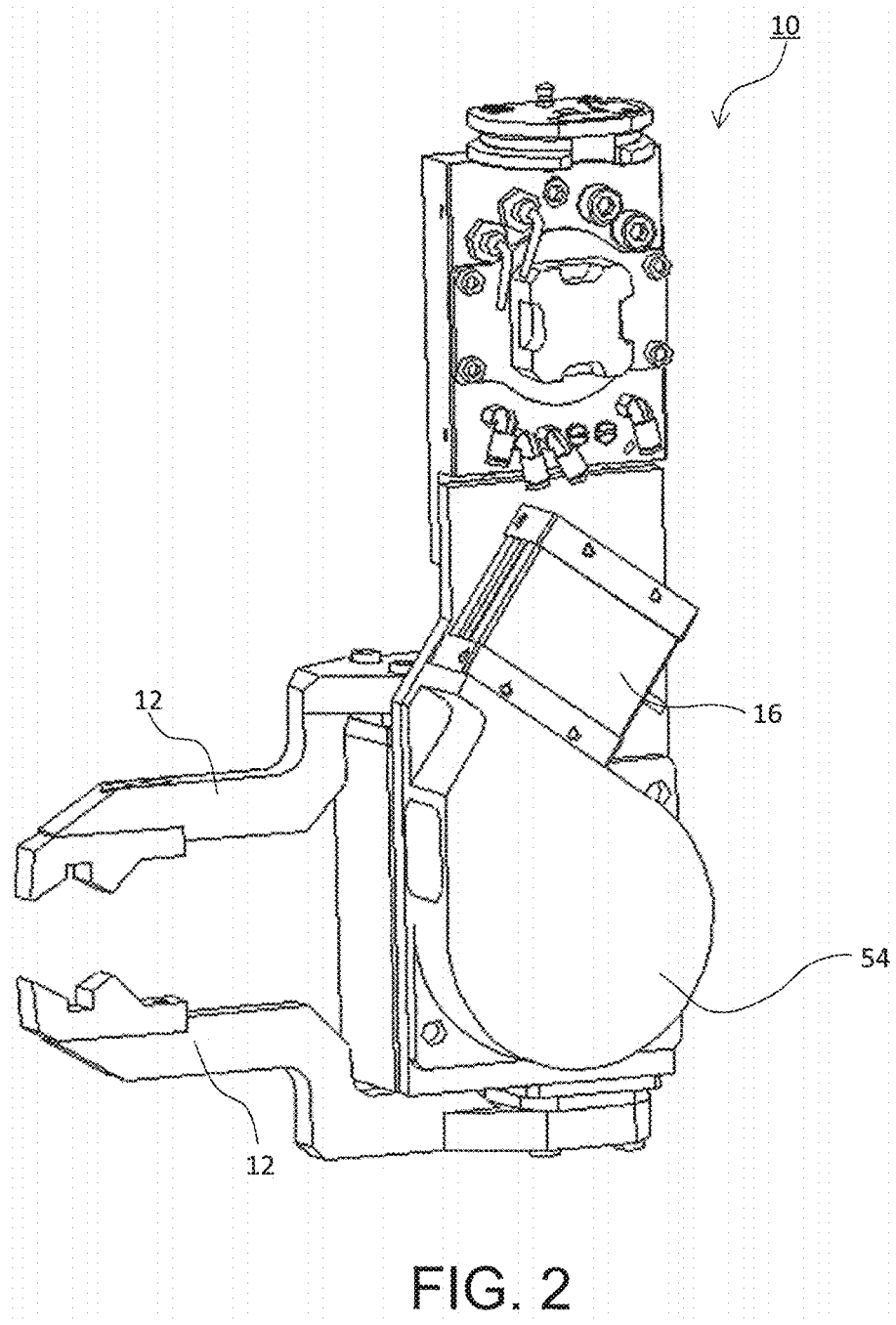
FIG. 2 is a perspective view of the gripper device as viewed from the rear.
Figure 3:
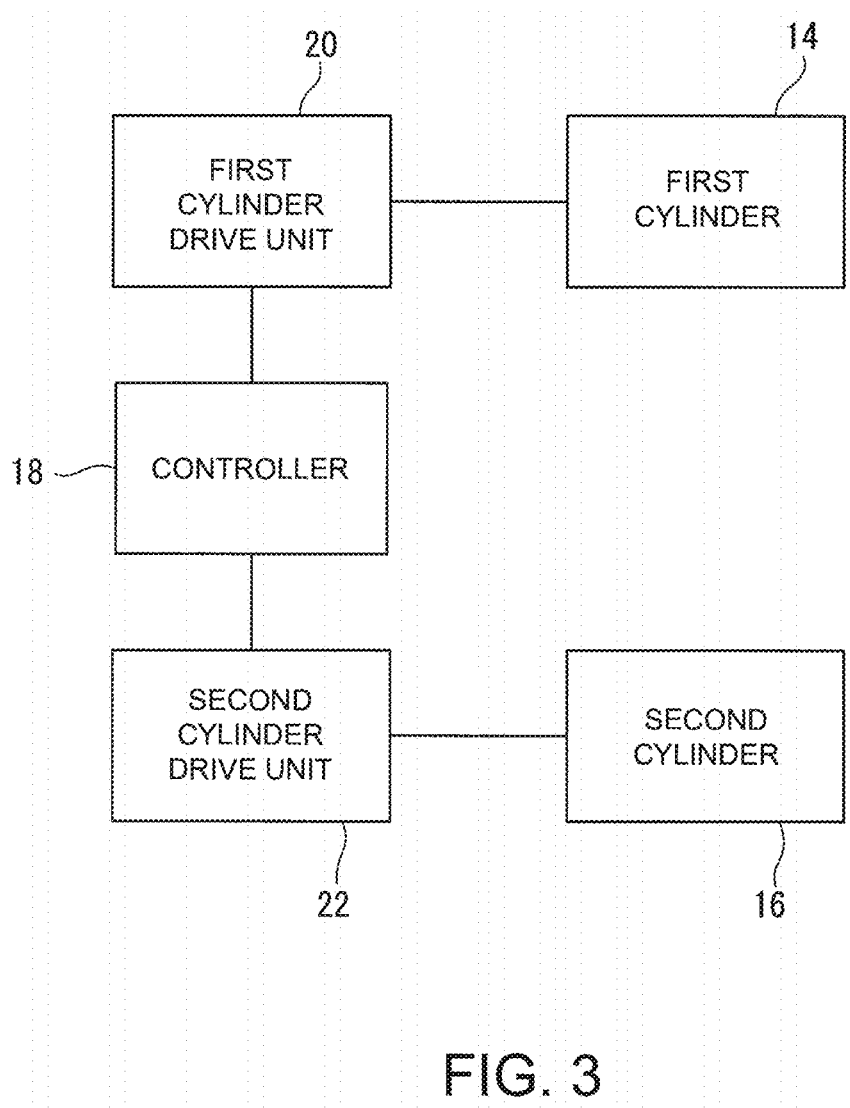
FIG. 3 shows a configuration of a drive system for the gripper device.

Hereinafter, a configuration of a gripper device 10 will be described with reference to the drawings. FIG. 1 is a perspective view of the gripper device 10 as viewed from the front, and FIG. 2 is a perspective view of the gripper device 10 as viewed from the rear. FIG. 3 shows a configuration of a drive system of the gripper device 10. The gripper device 10 is designed to be used as an end effector of a robot (not illustrated). The gripper device 10 includes a pair of gripper claws 12. The gripper claws 12 are movable along directions of approaching toward or separating from each other, and are able to hold an object therebetween when they are moved close to each other.

A first cylinder 14 (see FIG. 1) and a second cylinder 16 (see FIG. 2) are installed as driving sources for the gripper claws 12. Both the first cylinder 14 and the second cylinder 16 are air cylinders which are pneumatically actuated. When the gripper device 10 is used, the first cylinder 14 and the second cylinder 16 are connected, as shown in FIG. 3, to a first cylinder drive unit 20 and a second cylinder drive unit 22, respectively. Each of the cylinder drive units 20 and 22 is configured to drive the corresponding one of the cylinders 14 and 16, and includes at least an air compressor, and may further include other components, such as a valve and an air tank. Actuation of the cylinder drive unit 20, 22 is controlled by a controller 18. The controller 18 is a computer having a processor and a memory, and may be implemented, for example, by a controller of the robot in which the gripper device 10 is installed. As is evident from the configuration shown in FIG. 3, the first cylinder 14 and the second cylinder 16 can be operated independently of each other.

Further, in this example, the first cylinder 14 is a compact cylinder which has a long stroke but has a small driving force. On the other hand, the second cylinder 16 has a driving force greater than the first cylinder 14, yet the stroke of the second cylinder 16 is shorter than that of the first cylinder 14. In this regard, the second cylinder 16 is also a compact cylinder having a limited stroke.

Figure 4:
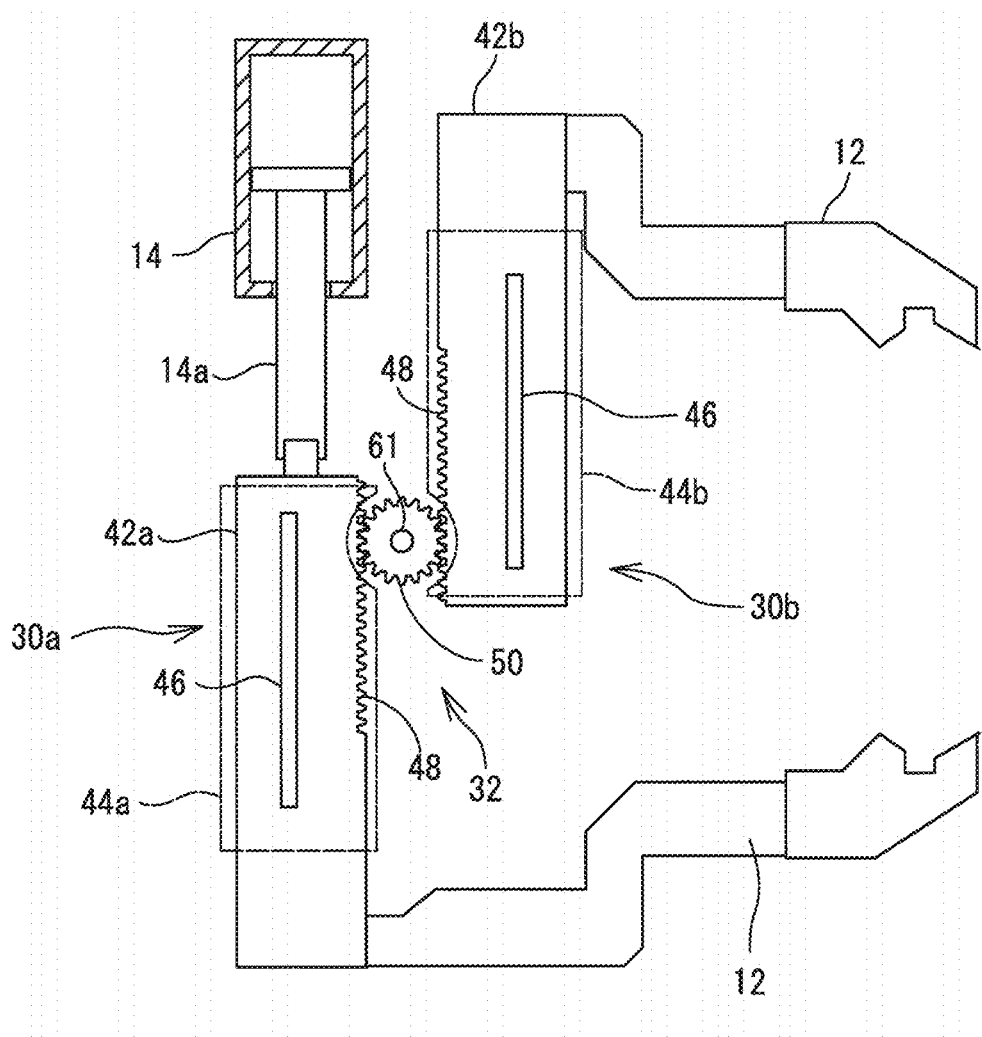
FIG. 4 is a schematic diagram showing the gripper device of FIG. 1 from which a front cover is removed.

A motion of the first cylinder 14 is transmitted via linear motion units 30a and 30b and a synchronization mechanism 32 to each of the gripper claws 12, which is explained with reference to FIG. 4. FIG. 4 schematically shows the gripper device 10 of FIG. 1 from which a front cover 40 is removed.

As illustrated in FIG. 4, the linear motion units 30a and 30b are mounted on the gripper claws 12 on a one-to-one basis. It should be noted that the linear motion units 30a, 30b are simply referred to as "linear motion units 30" without using a suffix letter a or b when the difference therebetween may be disregarded. The same is applied to outer casings 44 and linearly moving bodies 42 which will be described below.

Each of the linear motion units 30 has the outer casing 44 and the linearly moving body 42. The linearly moving body 42 is an elongated cylindrical member extending along a travel direction of the gripper claws 12. The linearly moving body 42 is mechanically coupled to the corresponding one of the gripper claws 12, and the gripper claw 12 travels linearly forward and rearward when the linearly moving body 42 is linearly advanced and retreated. The two linearly moving bodies 42 are arranged at approximately 180-degree rotationally symmetric positions about a below-described synchronization gear 50 located between the linearly moving bodies 42. The linearly moving body 42 has a peripheral surface on which one or more spline slots 46 extending along an advancing and retreating direction are defined. A guide projection (not illustrated) in the outer casing 44, which will be described below, is fitted in the spline slot 46 to prevent rotation of the linearly moving body 42, thereby restricting a movable direction of the linearly moving body 42.

The peripheral surface of the linearly moving body 42 also has a claw rack 48 extending along the advancing and retreating direction. The claw rack 48 constitutes a part of the synchronization mechanism 32, and is configured to engage the synchronization gear 50. One of the two linearly moving bodies 42; i.e., the linearly moving body 42a, is mechanically coupled to a piston 14a of the first cylinder 14, and is therefore able to advance or retreat when the first cylinder 14 is driven.

The outer casing 44 is fixed to a stationary member (such as, for example, the front cover 40), and maintained at a fixed position regardless of advancing and retreating motions of the gripper claws 12. An opening is defined somewhere between axial ends of the outer casing 44, in order to expose the claw rack 48 of the linearly moving body 42 to the synchronization gear 50. An inner circumferential surface of the outer casing 44 has the guide projection (not illustrated) which is fitted into the spline slot 46.

The synchronization mechanism 32 is configured to synchronize movement of the two linearly moving bodies 42. The synchronization mechanism 32 includes the craw racks 48 formed on the two linearly moving bodies 42, and the synchronization gear 50 which is engaged with the claw racks 48. The synchronization gear 50 is, as shown in FIG. 4, simultaneously engaged with the two claw racks 48 which are respectively formed on the two linear motion units 30. Motions of the two linearly moving bodies 42 can be synchronized by arranging the synchronization gear 50.

The behavior of the gripper claws 12 is explained more specifically. When one of the linearly moving bodies 42; i.e., the linearly moving body 42a, is moved rectilinearly downward in FIG. 4 by an extending action of the first cylinder 14, the claw rack 48 disposed on the linearly moving body 42a is accordingly moved rectilinearly downward in FIG. 4. As a result, the synchronization gear 50 engaged with the claw rack 48 is rotated in a counterclockwise direction in FIG. 4. The counterclockwise rotation of the synchronization gear 50 causes the other of the linearly moving bodies 42; i.e., the linearly moving body 42b, to move rectilinearly upward in FIG. 4. In other words, when the first cylinder 14 is extended, the two gripper claws 12 are moved along directions of moving away from each other, and accordingly are opened. When the first cylinder 14 is retracted, the two gripper claws 12 behave in a manner opposite to the above-described direction. That is, the two gripper claws 12 are moved toward each other, and accordingly are closed.

Here, in this example, two movable units are provided, each of which consists of the gripper claw 12 and the linearly moving body 42. The two movable units have approximately the same mass, which allows the two movable units to function as counterweights to each other. For this reason, the two gripper claws 12 and the two linearly moving bodies 42 can be moved even with the small driving force of the first cylinder 14. While the stroke of the first cylinder 14 is long, the driving force thereof is small as described above. Therefore, the gripper device 10 incorporating only the first cylinder 14 would not have a sufficiently strong gripping force for holding, for example, a heavy object. With this in view, the second cylinder 16 and a transmission mechanism 34 for transmitting a motion of the second cylinder 16 are installed in this example.

Figure 5:
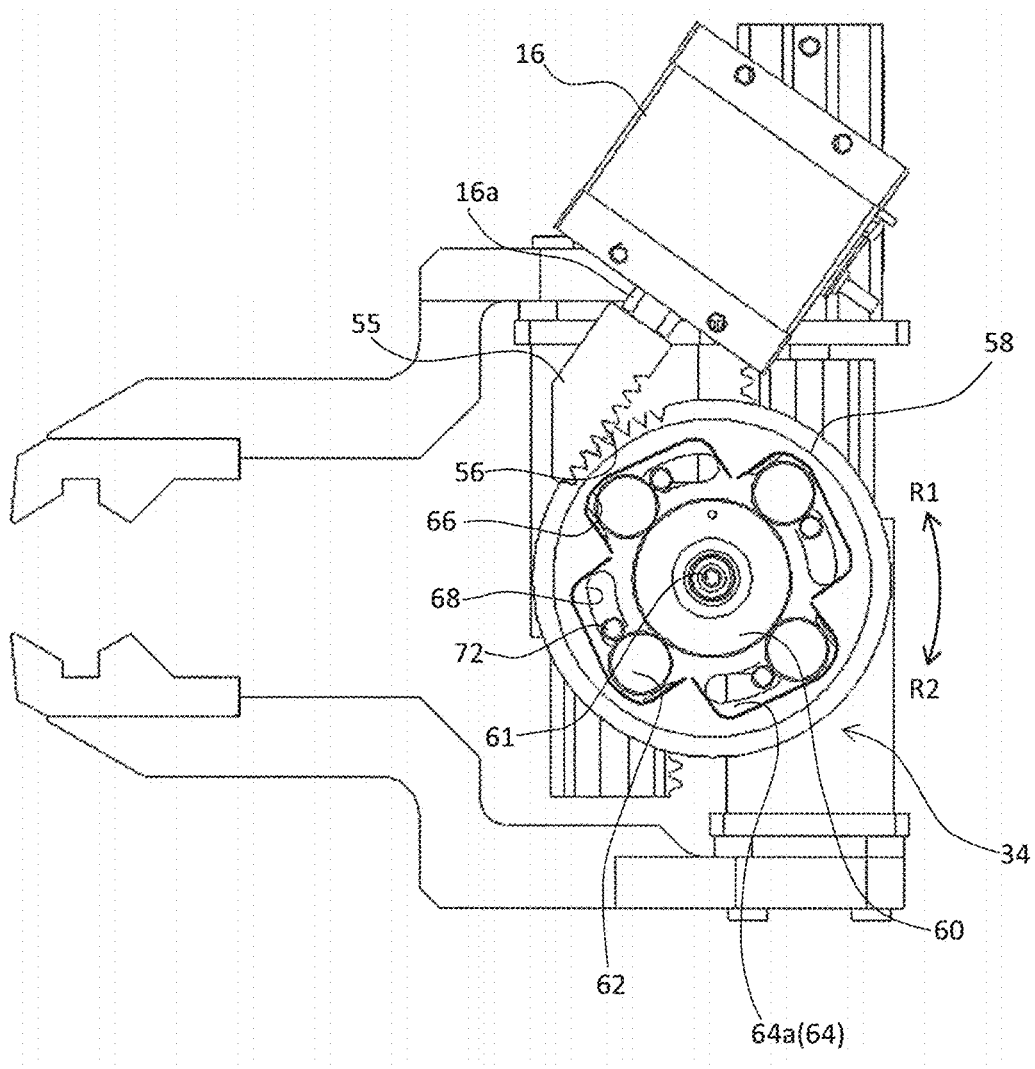
FIG. 5 is a drawing showing the gripper device of FIG. 2 from which a rear cover is removed.
Figure 6:
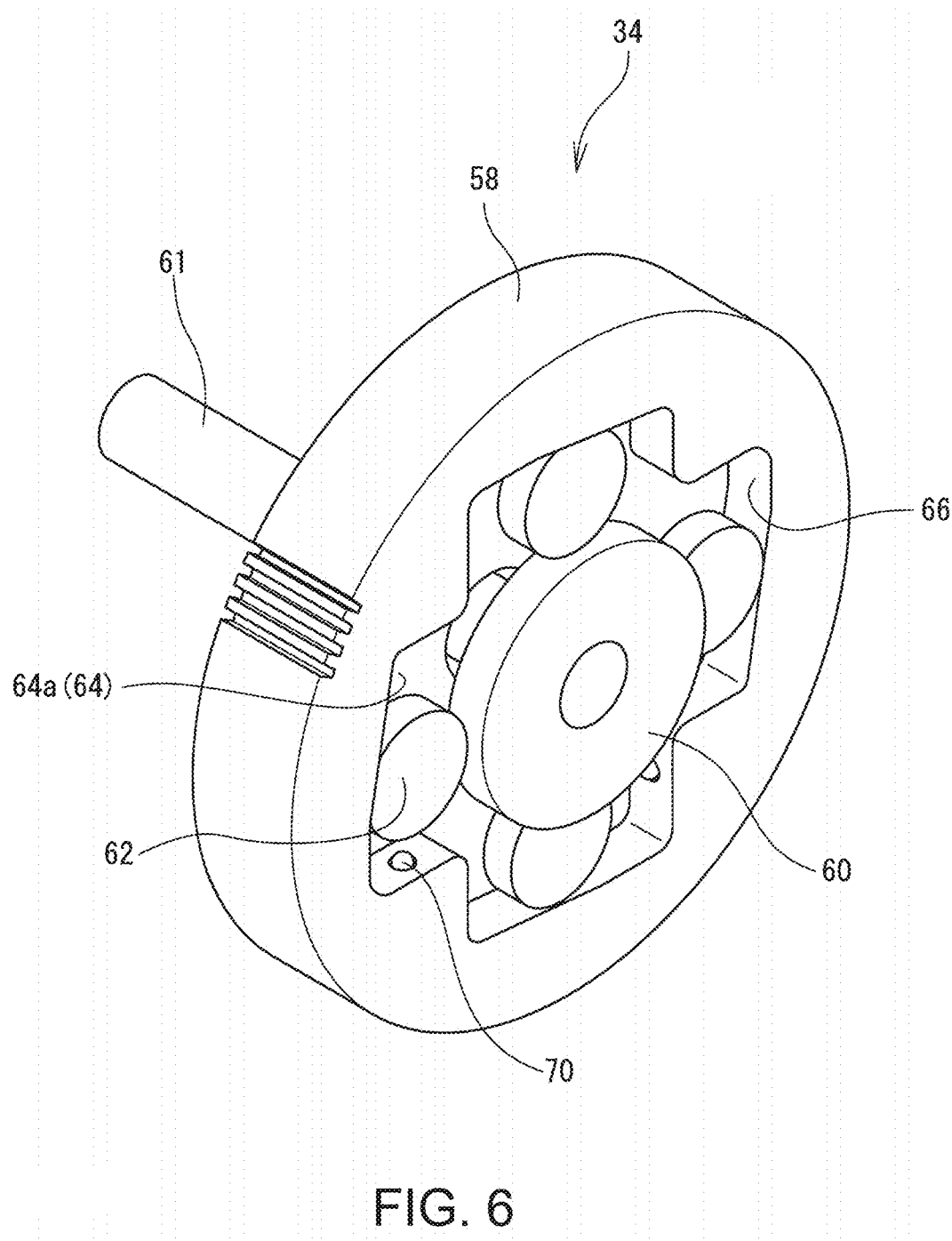
FIG. 6 is a perspective view showing a part of a transmission mechanism.
Figure 7:
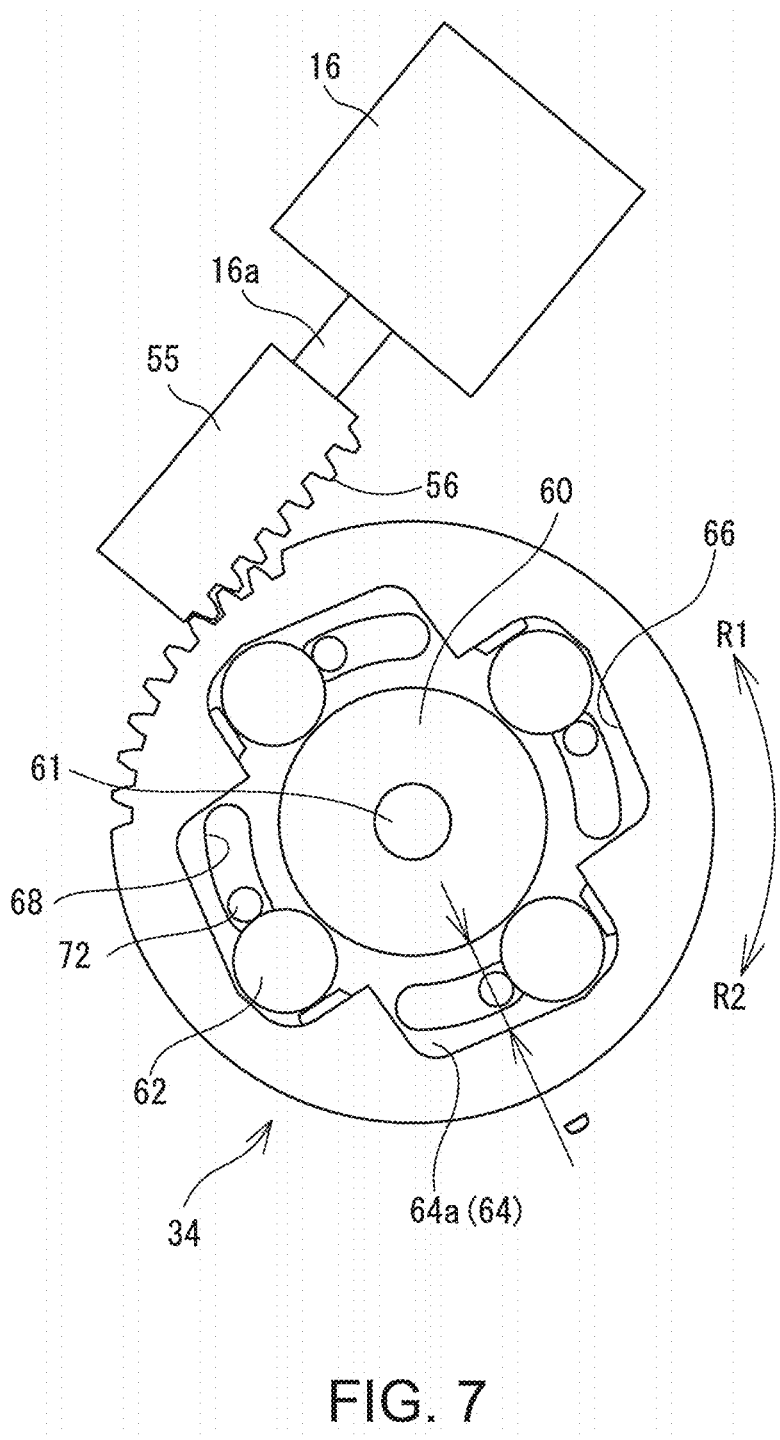
FIG. 7 is a front view of the transmission mechanism in which a second cylinder is fully retracted.
Figure 8:
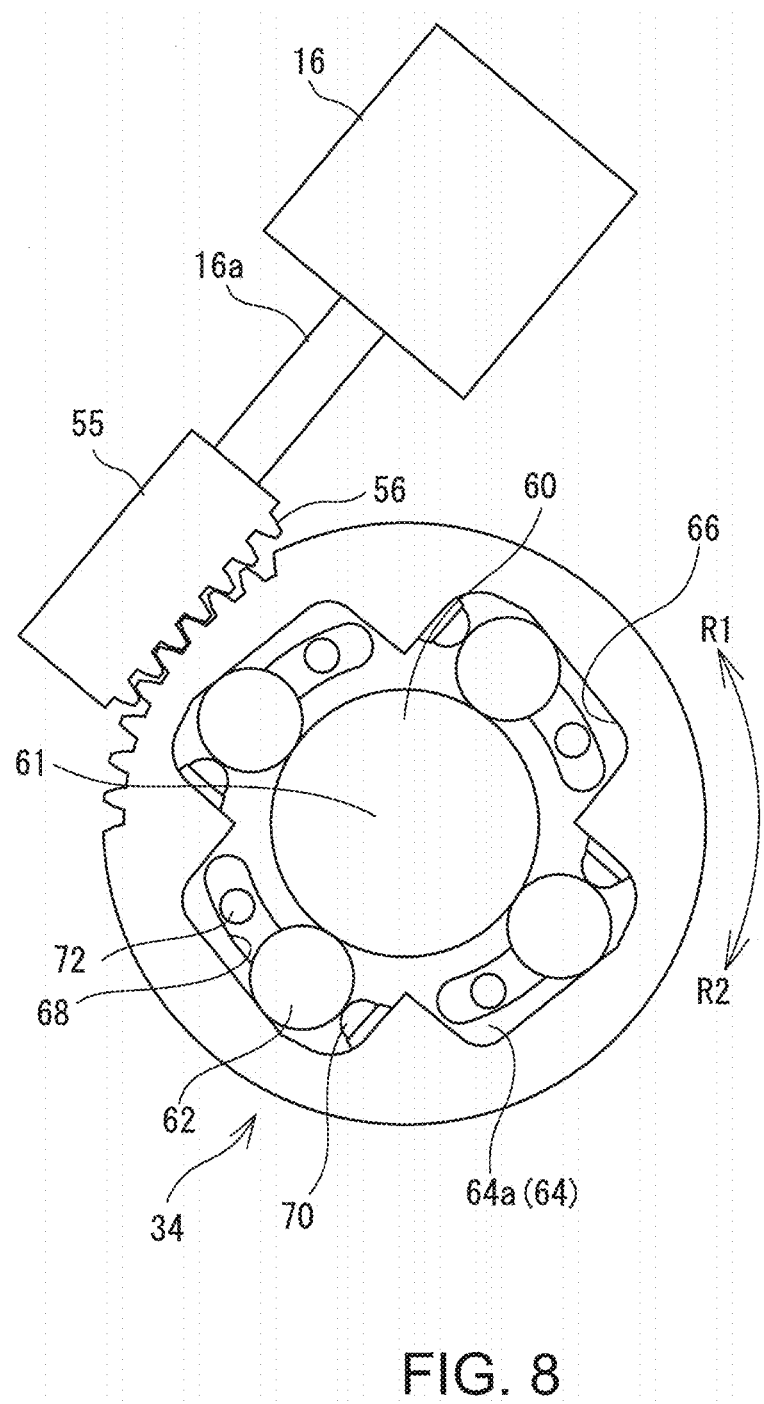
FIG. 8 is a front view of the transmission mechanism in which the second cylinder is extended from the state shown in FIG. 7.

The second cylinder 16 is an air cylinder having a stroke shorter than the first cylinder 14 and a driving force greater than that of the first cylinder 14. The transmission mechanism 34 transmits the action of the second cylinder 16 to the synchronization gear 50. However, the transmission mechanism 34 is configured as a cam-type one-way clutch which functions to transmit the driving force of the second cylinder 16 which is being extended, but not to transmit the driving force of the second cylinder 16 which is being retracted. Components of the transmission mechanism 34 are explained with reference to FIG. 5 to FIG. 8. FIG. 5 is a diagram showing the gripper device in FIG. 2 from which a rear cover 54 is removed, and FIG. 6 is a perspective view showing a part of the transmission mechanism 34. FIG. 7 is a front view showing the transmission mechanism 34 in a state where the second cylinder 16 is fully retracted, and FIG. 8 is a front view showing the transmission mechanism 34 in a state where the second cylinder 16 is extended from the retracted state of FIG. 7.

The transmission mechanism 34 includes a movable block 55, an outer wheel 58, an inner wheel 60, relay rollers 62, a spring plunger 70 (unillustrated in FIG. 5 and FIG. 7 but shown in FIG. 6 and FIG. 8), and fixed pins 72. The movable block 55 is always coupled to a piston 16a of the second cylinder 16 so as to move rectilinearly in conjunction with the piston 16a. A peripheral surface of the movable block 55 is equipped with an input rack 56 extending along a travel direction of the movable block 55.

The outer wheel 58 is a rotational member having a gear on the outer circumferential surface. The outer wheel 58 is always mechanically connected to the second cylinder 16 via the input rack 56, and is thus rotated by an extending or retracting motion of the second cylinder 16. Here, in the example of FIG. 5, the outer wheel 58 is rotated in a counterclockwise direction when the second cylinder 16 is extended, and rotated in a clockwise direction when the second cylinder 16 is retracted. Hereinafter, a rotational direction of the outer wheel 58 which is rotated by the extending motion of the second cylinder 16 (i.e., the counterclockwise direction in FIG. 5) is referred to as "a first rotational direction R1", and a rotational direction of the outer wheel 58 which is rotated by the retracting motion of the second cylinder 16 (i.e., the clockwise direction in FIG. 5) is referred to as "a second rotational direction R2".

A pocket 64 which is a recessed region is defined on an axial end surface of the outer wheel 58. A peripheral surface of the pocket 64 functions as a cam surface 66 for controlling the position of the relay roller 62 which will be described below. A contour of the pocket 64 is substantially formed in the shape of a cross in the axial view. Therefore, a space bordered by an outer circumferential surface of the inner wheel 60 and the cam surface 66 has a shape composed of four approximate rectangles arranged at 90 degree intervals. Hereinafter, a space of the approximate rectangle is referred to as "a pocket piece 64a", and a width of the space between the cam surface 66 and the outer circumferential surface of the inner wheel 60 is referred to as "a pocket width D". The cam surface 66 is slanted in such a manner that the pocket width D gradually decreases from the end of the first rotational direction R1 toward the end of the second rotational direction R2.

Inside the pocket 64, the inner wheel 60 and the relay rollers 62 are placed. The inner wheel 60 is a rotational member disposed concentrically within the outer wheel 58. The inner wheel 60 is always mechanically coupled via an output shaft 61 to the synchronization gear 50. Therefore, the inner wheel 60 always rotates in synchronism with the synchronization gear 50. As will be explained below, when the outer wheel 58 is rotated along the first rotational direction R1, the inner wheel 60 is connected via the relay rollers 62 to the outer wheel 58 and rotated in the same direction as the outer wheel 58 (that is, the first rotational direction R1). When the outer wheel 58 and the inner wheel 60 are rotated in the first rotational direction R1, the synchronization gear 50 rotates in a direction that closes the gripper claws 12 (in the clockwise direction of FIG. 4).

The relay rollers 62 are disposed between the outer circumferential surface of the inner wheel 60 and the cam surface 66. One relay roller 62 is placed in one pocket piece 64a, and four relay rollers 62 in total are arranged. Here, the pocket width D of the pocket piece 64a is sufficiently greater than the diameter of the relay roller 62 at a position close to the end of the first rotational direction R1. Therefore, when the relay roller 62 is located at the end of the pocket piece 64a toward the first rotational direction R1 as shown in FIG. 7, the relay roller 62 is in a state of being separated from at least either of the cam surface 66 (and thus the outer wheel 56) or the inner wheel 60. Hereinafter, the position at which the relay roller 62 is separated from at least one of the outer roller 58 and the inner roller 60 is referred to as "a disengaging position".

On the other hand, the pocket width D becomes smaller than the diameter of the relay roller 62 in the vicinity of the circumferential center of the pocket piece 64a. Therefore, the relay roller 62 located at a position close to the circumferential center of the pocket piece 64a as shown in FIG. 8 is brought into intimate contact with both the cam surface 66 (and thus the outer wheel 58) and the inner wheel 60. Hereinafter, the position at which the relay roller 62 is brought into intimate contact with both the outer roller 58 and the inner roller 60 is referred to as "an engaging position".

A spring plunger 70 is embedded in the pocket piece 64a at its end toward the first rotational direction R1. The spring plunger 70 urges the relay roller 62 along the second rotational direction R2; i.e., toward the engaging position. In addition, a cam hole 68 is defined for each of the pocket pieces 64 in its bottom surface, and the fixed pin 72 is inserted through the cam hole 68. The fixed pin 72 is fixed to a stationary member (such as, for example, the rear cover 54). Because the fixed pin 72 is stationary, a relative positional relationship between the fixed pin 72 and the relay roller 62 changes as the outer wheel 58 is rotated.

Next, power transmission achieved by the transmission mechanism 34 is explained with reference to FIG. 7 and FIG. 8. When the second cylinder 16 is fully retracted as shown in FIG. 7, each of the fixed pins 72 pushes the corresponding relay roller 62 against the urging force of the spring plunger 70 along the first rotational direction R1. Then, the relay roller 62 is placed in the disengaging position and separated from at least one of the cam surface 66 and the outer circumferential surface of the inner wheel 60. Therefore, rotation of the outer wheel 58 is not transmitted to the inner wheel 60, and vice versa. As a result, in the state of FIG. 7, even when the synchronization gear 50 is rotated in response to the extending or retracting motion of the first cylinder 14, rotation of the synchronization gear 50 causes only the inner wheel 60 to rotate and has no effect on the outer wheel 58 or the movable block 55.

On the other hand, when the second cylinder 16 is extended, the outer wheel 58 is rotated along the first rotational direction R1. This causes the relay roller 62 to move in a direction departing away from the fixed pin 72. When the fixed pin 72 and the relay roller 62 are separated from each other, the relay roller 62 is pushed along the second rotational direction R2 by the urging force of the spring plunger 70. In this state, the relay roller 62 starts revolving around the inner wheel 60 along the clockwise direction. As a result of this orbital movement, the relay roller 62 is moved to the engaging position. Upon arrival at the engaging position, the relay roller 62 is brought into firm, intimate contact with both the inner wheel 60 and the outer wheel 58 due to wedging action, which causes the relay roller 62 to stop revolving. Consequently, rotation of the outer wheel 58 is transmitted through the relay roller 62 to the inner wheel 60, so that the outer wheel 58 and the inner wheel 60 are rotated together along the first rotational direction R1.

That is, in this example, when the second cylinder 16 is extended, the wedge effect is produced, and rotation of the outer wheel 58 is transmitted to the inner wheel 60 via the relay roller 62. Here, the inner wheel 60 is always coupled to the synchronization gear 50. For this reason, the driving force of the second cylinder 16 is transmitted through the inner wheel 60, the synchronization gear 50, and through the linearly moving bodies 42 to the pair of gripper claws 12 as a force to close the gripper claws 12 when the second cylinder 16 is extended. In this way, the gripping force of the gripper claws 12 can be increased.

On the other hand, when the second cylinder 16 is retracted from the state shown in FIG. 8, the outer wheel 58 is rotated along the second rotational direction R2, while the relay rollers 62 revolve around the inner wheel 60 along the counterclockwise direction which is the direction of moving away from the engaging position. As a result, because frictional resistance of the relay rollers 62 against the cam surface 66 and the outer wheel 58 becomes smaller, rotation of the outer wheel 58 is not transmitted to the inner wheel 60. In summary, according to the above-described configuration of the present example, the extending motion of the second cylinder 16 is transmitted to the inner wheel 60 and thus the gripper claws 12, whereas the retracting motion of the second cylinder 16 is not transmitted to the gripper claws 12. It should be noted that in the state where the second cylinder 16 is fully retracted, motion of the first cylinder 14 is not transmitted to the outer wheel 58.

Next, drive control of the gripper device 10 is briefly explained. When the gripper claws 12 are used for holding an object, the controller 18 previously operates the second cylinder 16 to be fully retracted for releasing engagement between the second cylinder 16 and the gripper claws 12. In this state, the controller 18 operates the first cylinder 14 to extend in order to open the gripper claws 12. Here, because the first cylinder 14 has the small driving force yet has the long stroke, the gripper claws 12 can have a long travel stroke.

When the object to be grabbed is positioned between the gripper claws 12, the controller 18 operates the first cylinder 14 to retract for closing the gripper claws 12. Then, when the gripper claws 12 make physical contact with the object, the controller 18 stops operation of the first cylinder 14. Immediately before or immediately after the gripper claws 12 contact the object, the controller 18 operates the second cylinder 16 to start extending. The outer wheel 58 is rotated along the first rotation direction R1 by the extending motion of the second cylinder 16, and the relay rollers 62 are accordingly brought into contact and engaged with both the outer wheel 58 and the inner wheel 60. As a result of the engagement, the motion of the outer wheel 58 is transmitted via the relay rollers 62 to the inner wheel 60, and the motion of the inner wheel 60 is transmitted via the synchronization gear 50 and other components to the gripper claws 12. Because the second cylinder 16 has a driving force greater than that of the first cylinder 14, a stronger gripping force can be obtained by transmitting the force of the second cylinder 16 to the gripper claws 12. Further, because the diameter of the outer wheel 58 is sufficiently larger than the diameter of a pitch circle of the synchronization gear 50 for amplifying a rotational force of the outer wheel 58 and thus the driving force of the second cylinder 16, it is possible to amplify the driving force of the second cylinder 16 and transmit the amplified force to the synchronization gear 50. As a result, the gripping force of the gripper device 10 can be further increased.

As can be understood from the above explanation, the gripper claws 12 are opened and closed, in this example, by means of the first cylinder 14 having the long stroke and the small driving force, and the force of the second cylinder 16 having the small stroke and the great driving force is transmitted to the gripper claws 12 only when strong gripping force is needed. In this way, the gripper device 10 having both a long stroke and a strong gripping force can be obtained without using a large air cylinder. In addition, because the strong gripping force can produce a strong friction force between the object and each of the gripper claws 12, the gripper device 10 is able to hold the object without slipping.

Figure 9:
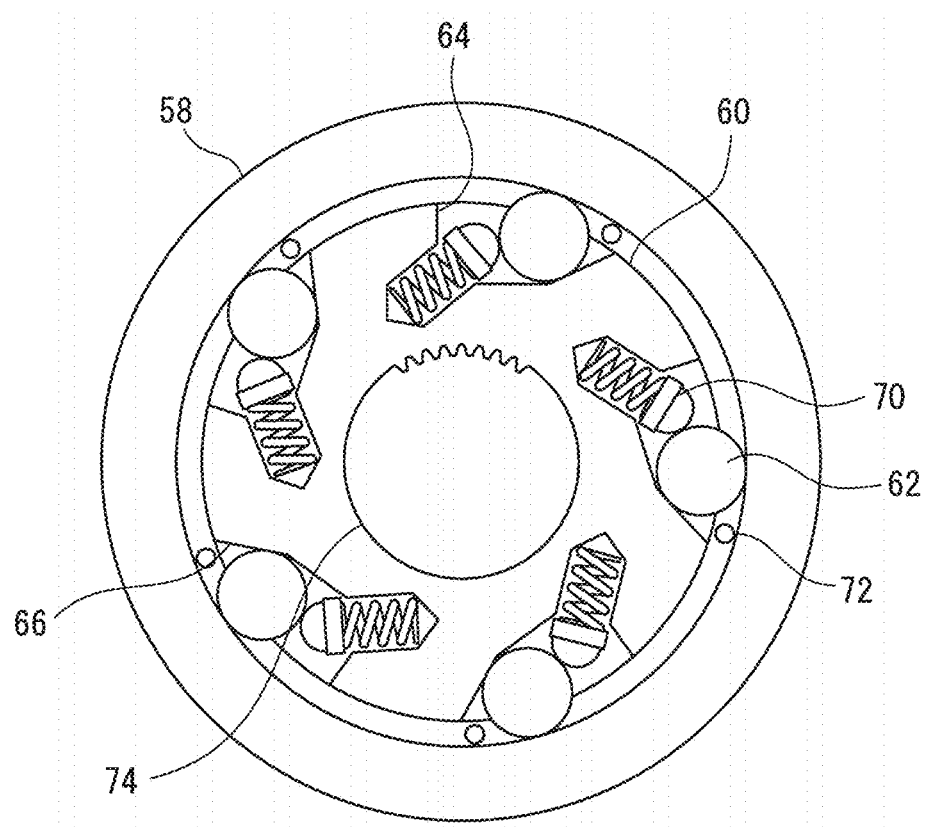
FIG. 9 is a diagram showing an alternative example of a cam-type one-way clutch.

Although in the above explanation the outer wheel 58 is always coupled to the second cylinder 16 while the inner wheel 60 is always coupled to the synchronization mechanism 32, such a coupling relationship may be established oppositely. For example, as illustrated in FIG. 9, an input gear 74 axially extending above from the drawing sheet may be formed at the center of the inner wheel 60, and may be engaged with the input rack 56. In this case, the output shaft 61 axially extending below the drawing sheet may be disposed at the center of the outer wheel 58 and fixed to the synchronization gear 50. Further, in this case, pockets 64 may be defined in the inner wheel 60 as shown in FIG. 9, and the spring plunger 70 may be embedded in the cam surface 66 of each of the pockets 64.

Figure 10:
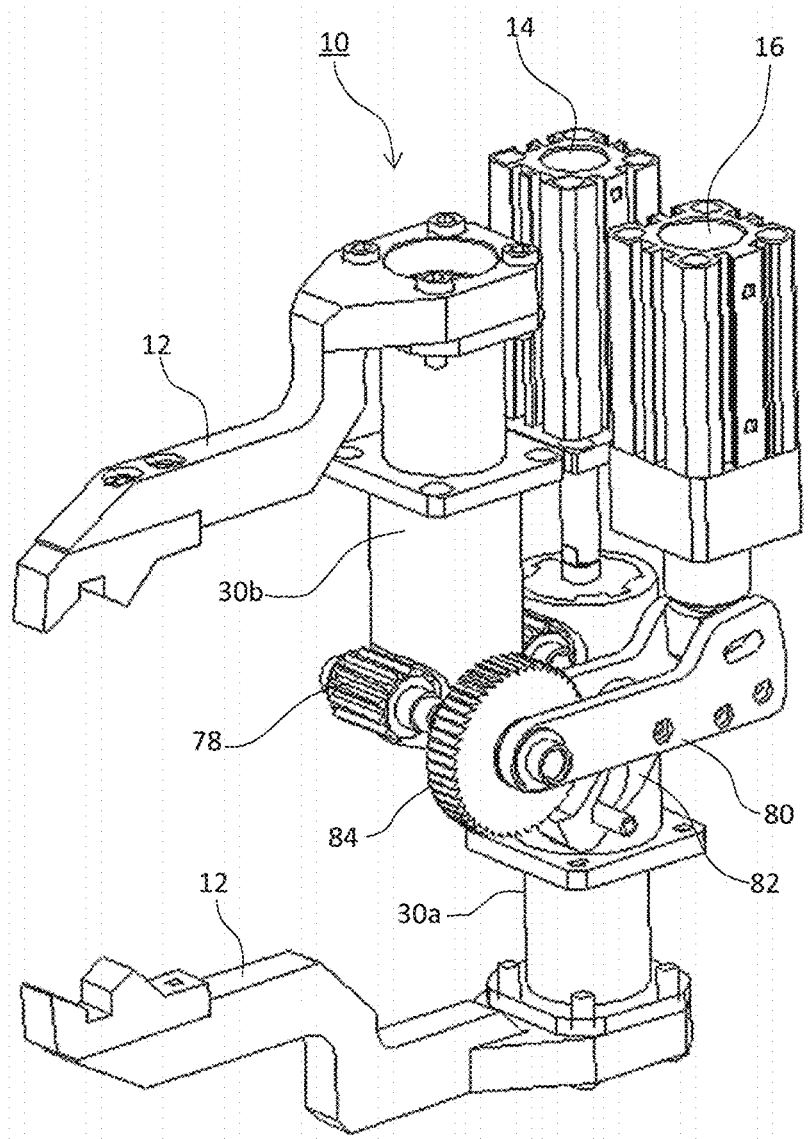
FIG. 10 is a perspective view of another gripper device.
Figure 11:
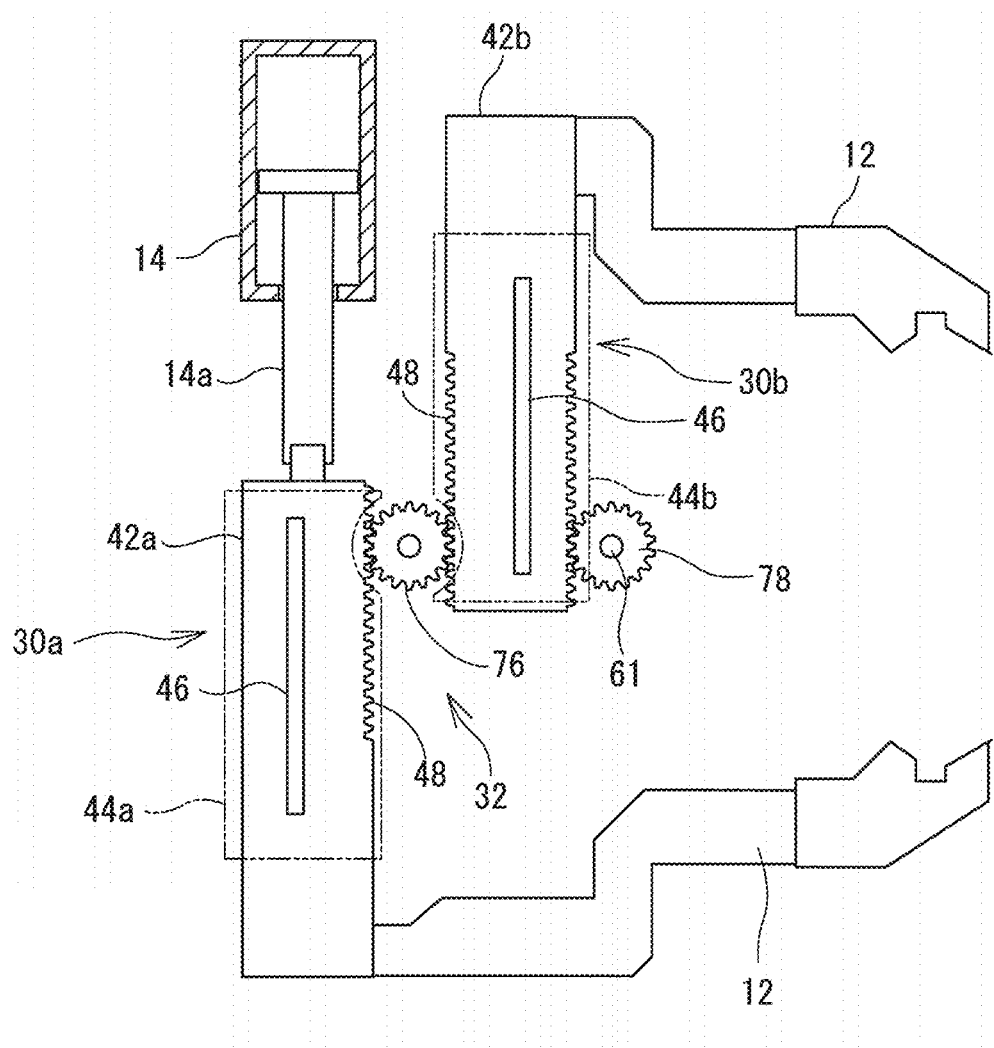
FIG. 11 shows a configuration of a synchronization mechanism installed in the gripper device of FIG. 10.

Hereinafter, another configuration example of the gripper device 10 is explained. FIG. 10 is a perspective view of a gripper device 10 in this example. In the gripper device 10 of this example, a synchronization mechanism 32 incorporates two synchronization gears 76 and 78 (see FIG. 11 for the synchronization gear 76 which is not indicated in FIG. 10), while a transmission mechanism 34 is implemented by means of a ratchet. First, a configuration of the synchronization mechanism 32 is explained. FIG. 11 shows the configuration of the synchronization mechanism 32 mounted on the gripper device 10 of FIG. 10. The gripper device 10 in this example has two linearly moving bodies 42a and 42b as in the case of the gripper device 10 shown in FIG. 1 and FIG. 2. The linearly moving body 42a which is directly coupled to the first cylinder 14 has one claw rack 48, while the other linearly moving body 42b has two claw racks 48 which are disposed symmetrically at 180-degree positions about the center axis of the linearly moving body 42b.

The synchronization mechanism 32 includes the claw racks 48 disposed on the linearly moving bodies 42, a first synchronization gear 76 disposed between the two linearly moving bodies 42a and 42b, and a second synchronization gear 78 disposed on the opposite side of the linearly moving body 42b from the first synchronization gear 76. The first synchronization gear 76 is concurrently engaged with two claw racks of the claw rack 48 disposed on the linearly moving body 42a and one of the claw racks 48 disposed on the linearly moving body 42b, to synchronize movement of the two linearly moving bodies 42a and 42b. Meanwhile, the second synchronization gear 78 is engaged with the other of the claw racks 48 on the linearly moving body 42b. The second synchronization gear 78 is fixed to the output shaft 61 of the transmission mechanism 34 so as to be rotated together with the output shaft 61.

Figure 12:
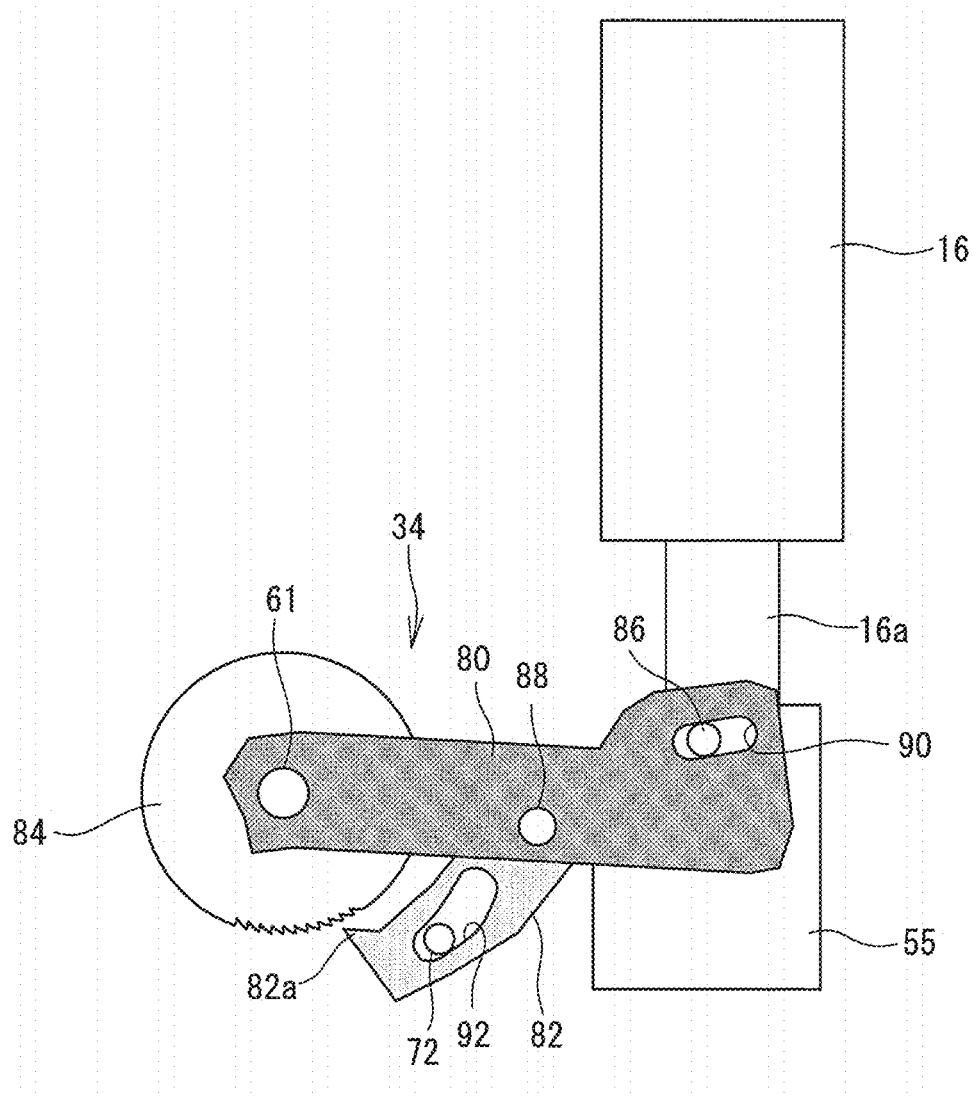
FIG. 12 is a front view of a transmission mechanism for the synchronization mechanism in FIG. 11, in which a second cylinder is fully retracted.
Figure 13:
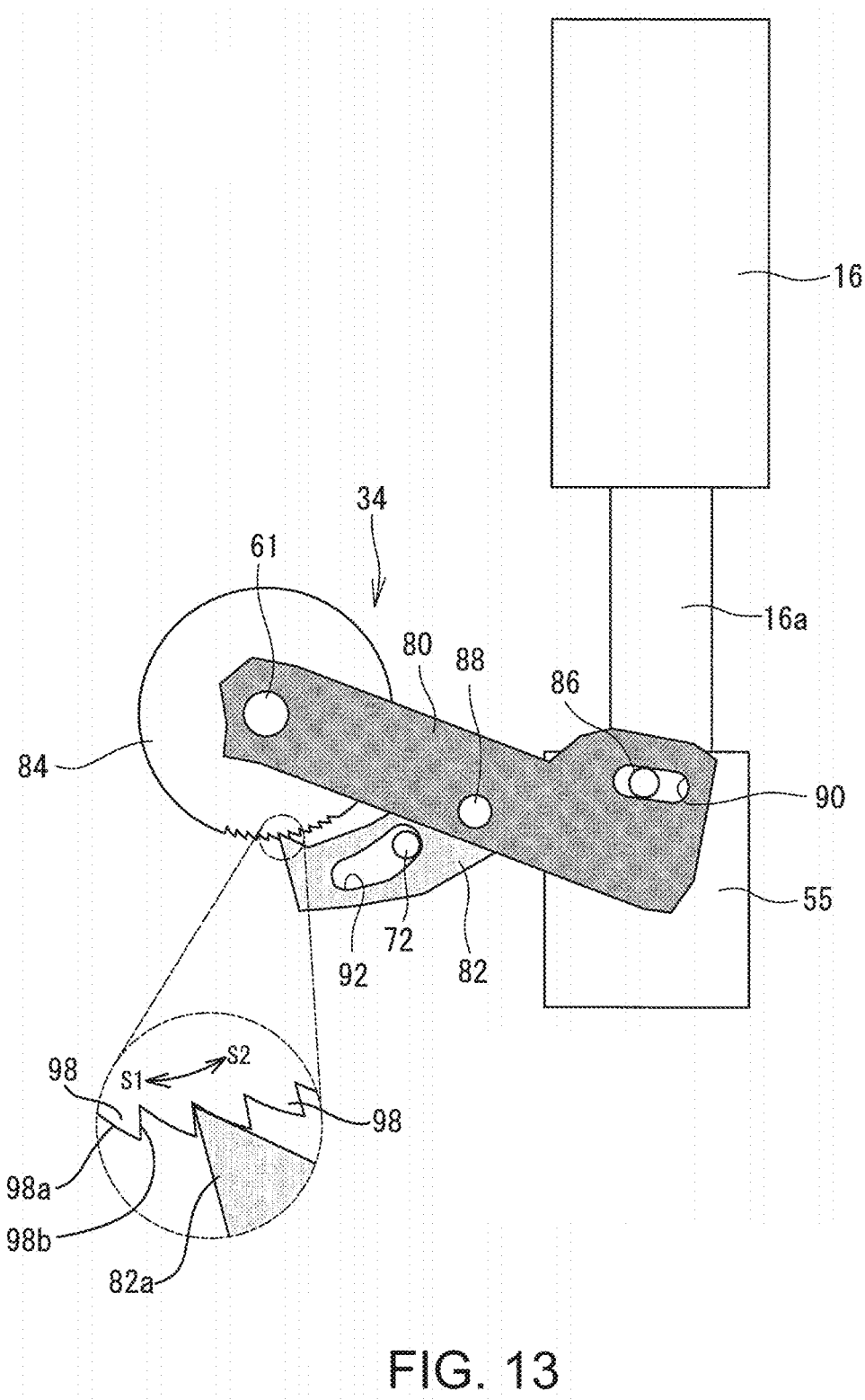
FIG. 13 is a front view of the transmission mechanism in which the second cylinder is extended from the state shown in FIG. 12.

Next, the transmission mechanism 34 mounted on the gripper device 10 in the example of FIG. 10 is explained with reference to the drawings. FIG. 12 and FIG. 13 show a configuration of the transmission mechanism 34. The transmission mechanism 34 includes a movable block 55, a swing lever 80, a ratchet pawl 82, and a ratchet gear 84. The movable block 55 is directly and mechanically coupled to the piston 16a of the second cylinder 16, to thereby linearly travel with the piston 16a. A movable pin 86 is projected from a peripheral surface of the movable block 55.

The swing lever 80 is suspended between the output shaft 61 and the movable pin 86, and is swingable about the output shaft 61. In the swing lever 80, a first cam hole 90 is defined, and the movable pin 86 is inserted through the first cam hole 90. When the movable pin 86 is lifted up and down as the second cylinder 16 is actuated, the swing lever 80 is swung around the output shaft 61 while being pushed by the movable pin 86.

Saw teeth are formed on the outer circumferential surface of the ratchet gear 84. The ratchet gear 84 is fixed to the output shaft 61 to be rotated together with the output shaft 61. Further, the second synchronization gear 78 is also fixed to the output shaft 61 as described above. Therefore, when the ratchet gear 84 is rotated, the second synchronization gear 78 is accordingly rotated, which, in turn, causes a rectilinear motion of the pair of gripper claws 12. Here, in the illustrated example, the gripper claws 12 are moved toward a closed position by clockwise rotation of the ratchet gear 84, and moved toward an opened position by counterclockwise rotation of the ratchet gear 84.

The latchet pawl 82 is attached at an appropriate point of the swing lever 80. A tip end of the latchet pawl 82 functions as a pallet 82a engageable with the saw teeth of the ratchet gear 84. The ratchet pawl 82 is pivotable relative to the swing lever 80 about the rotation shaft 88 disposed on the swing lever 80. Further, the ratchet pawl 82 also has a second cam hole 92 which is defined at some midpoint in the ratchet pawl 82. A fixed pin 72, which is secured to a stationary member (such as, for example, the rear cover 54), is inserted through the second cam hole 92. The pivot direction of the ratchet pawl 82 is defined by a contact relationship between the second cam hole 92 and the fixed pin 72.

Specifically, when the second cylinder 16 is fully retracted as shown in FIG. 12, the ratchet pawl 82 takes a position and an orientation in which the pallet 82a is separated from the ratchet gear 84. When the second cylinder 16 starts extending from the fully retracted position, the ratchet pawl 82 is pivoted in the direction of gradually approaching the ratchet gear 84 until the pallet 82a is engaged with the tooth of the ratchet gear 84 as shown in FIG. 13. A further extending action of the second cylinder 16 after the engagement between the pallet 82a and the tooth causes the ratchet pawl 82 to pivot in such a manner that the pallet 82a is advanced along the circumferential direction of ratchet gear 84 and also along the clockwise direction. On the other hand, when the second cylinder 16 is retracted from the fully extended state, the ratchet pawl 82 is pivoted in a direction opposite the above-described direction. Hereinafter, the direction in which the ratchet pawl 82 is pivoted by the extending action of the second cylinder 16 is referred to as "a first pivot direction S1", while the direction in which the ratchet pawl 82 is pivoted by the retracting action of the second cylinder 16 is referred to as "a second pivot direction S2".

Here, as can be seen from FIG. 13, each tooth 98 of the ratchet gear 84 is composed of a first side 98a and a second side 98b displaced from the first side 98a toward the counterclockwise direction. The first side 98a is slightly inclined from the circumferential direction, while the second side 98b is steeply inclined from the circumferential direction. In this case, when the pallet 82a having been engaged with the tooth 98 is moved in the clockwise direction; i.e., when the ratchet pawl 82 is pivoted along the first pivot direction S1, the pallet 82a pushes the first side 98a, which causes clockwise movement of the ratchet gear 84 in conjunction with the pallet 82a. On the other hand, when the pallet 82a having been engaged with the tooth 98 is moved along the counterclockwise direction; i.e., when the ratchet pawl 82 is pivoted along the second pivot direction S2, the pallet 82a slides along the surface of the slightly inclined second side 98b and eventually climbs over the tooth 98 to break contact therewith the tooth 98. As a result, the pallet 82a which is moved in the counterclockwise direction does not cause rotation of the ratchet gear 84, and allows the ratchet gear 84 to remain at rest. That is, in this example, when the ratchet pawl 82 is pivoted along the first pivot direction S1, power transmission from the ratchet pawl 82 to the ratchet gear 84 can be achieved by the ratchet pawl 82, whereas the power transmission from the ratchet pawl 82 to the ratchet gear 84 is disrupted when the ratchet pawl 82 is pivoted along the second pivot direction S2. In other words, the transmission mechanism 34 according to this example functions as a ratchet-type one-way clutch configured to transmit the driving force of the second cylinder 16 only when the second cylinder 16 is extended and not to transmit the driving force of the second cylinder 16 when it is retracted.

Next, the power transmission performed by the transmission mechanism 34 is explained in detail. As shown in FIG. 12, when the second cylinder 16 is fully retracted, the ratchet pawl 82 is located away from the ratchet gear 84. Therefore, in this state, rotation of the second synchronization gear 78 is not transmitted to the ratchet pawl 82. As a result, in the state shown in FIG. 12, even though the second synchronization gear 78 is rotated by the advancing or retracting motion of the first cylinder 14, only the ratchet gear 84 is rotated, while the ratchet pawl 82 and the swing lever 80 are not affected by the rotation of the second synchronization gear 78.

On the other hand, when the second cylinder 16 is extended, the ratchet pawl 82 is pivoted along the first pivot direction S1, and accordingly engaged with the ratchet gear 84. When the second cylinder 16 is further extended after the engagement, the pallet 82a of the ratchet pawl 82 is moved along the circumferential direction of the ratchet gear 84 and also along the clockwise direction. As a result, the driving force of the second cylinder 16 is transmitted to the ratchet gear 84 through the ratchet pawl 82, and the movement of the ratchet gear 84 is transmitted via the second synchronization gear 78 and other components to the pair of gripper claws 12 as the force to close the gripper claws 12. In this way, the gripping force of the gripper claws 12 can be enhanced. In addition, the swing radius of the swing lever 80 is sufficiently greater than the diameter of the pitch circle of the second synchronization gear 78. For this reason, the swinging force of the swing lever 80 and thus the driving force of the second cylinder 16 are amplified, and the thus amplified force is transmitted to the second synchronization gear 78. Consequently, the gripping force of the gripper device 10 can be further enhanced.

When the second cylinder 16 is retracted from the state shown in FIG. 13, causing the ratchet pawl 82 to pivot along the second pivot direction S2, because the pallet 82a of the ratchet pawl 82 is moved, as described above, to slip off the tooth of the ratchet gear 84, the driving force of the second cylinder 16 is not transmitted to the ratchet gear 84. That is, in the configuration of this example, the extending motion of the second cylinder 16 is transmitted to the ratchet gear 84 and thus the gripper claws 12, while the retracting motion of the second cylinder 16 is not transmitted to the gripper claws 12. Further, in the fully retracted state of the second cylinder 16, the motion of the first cylinder 14 is not transmitted to the ratchet pawl 82. Operation control in the thus-configured gripper device 10 of this example is the same as that of the gripper device 10 shown in FIG. 1 and FIG. 2, and the description related to the control is not repeated.

As is evident from the above explanation, also in the gripper device 10 shown in FIG. 10, the first cylinder 14 having the long stroke and the small driving force is used for opening and closing the gripper claws 12, and the second cylinder 16 having the short stroke and the strong driving force is used for transmitting the force of the second cylinder 16 to the gripper claws 12 only when a strong gripping force is needed. As a result, the gripper device 10 having both a long stroke and a strong gripping force can be implemented without the need of employing any air cylinder which is large in size.

Figure 14:
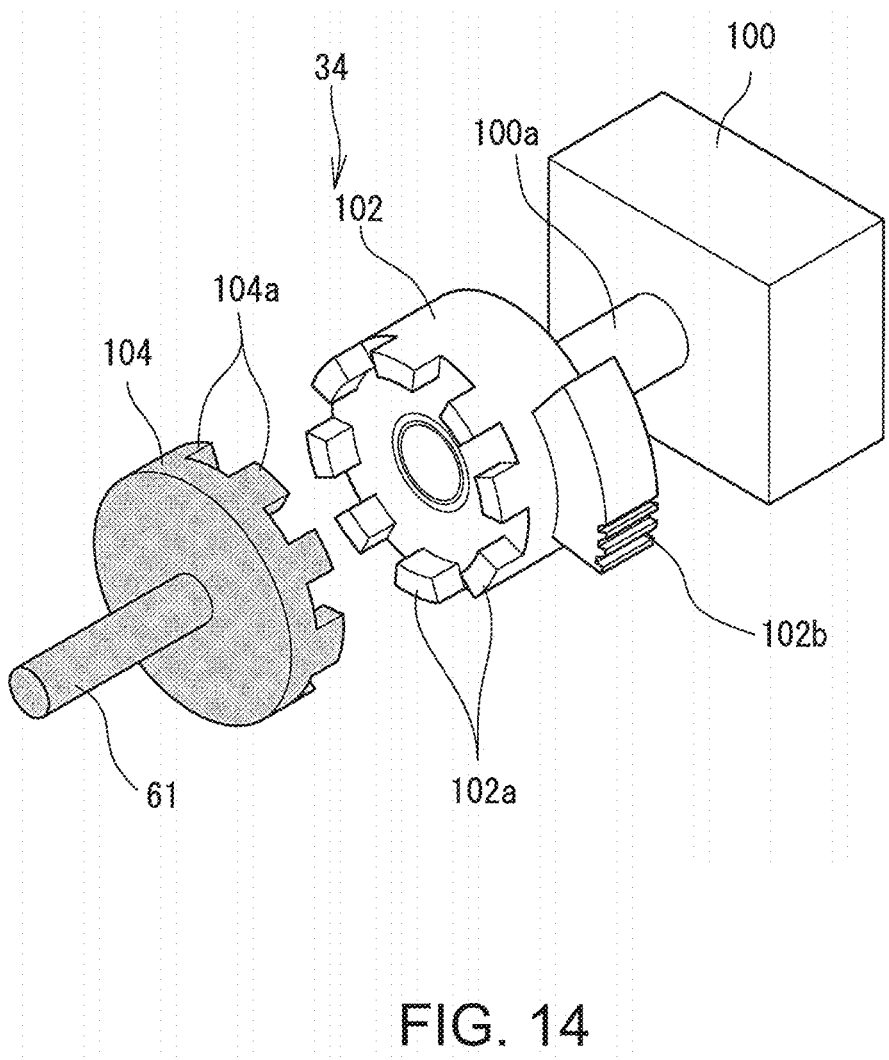
FIG. 14 shows another example of the transmission mechanism.

Next, a further configuration example of the gripper device 10 is described. FIG. 14 is a perspective view of a transmission mechanism 34 used in another gripper device 10 according to the further example. Although the transmission mechanism 34 in the gripper device 10 of the previous example includes the one-way clutch, the transmission mechanism 34 illustrated in FIG. 14 includes a dog clutch. Specifically, the transmission mechanism 34 of this example includes an actuator 100, an input wheel 102, and an output wheel 104. An output shaft 61 axially extends from the center of the output wheel 104, and is mechanically coupled to the synchronization mechanism 32. In addition, two or more engaging teeth 104a project from an axial end surface of the output wheel 104 along the axial direction thereof.

The engaging teeth 104a are spaced from each other along the circumferential direction of the output wheel 104 as shown in FIG. 14.

The input wheel 102 is opposed to the output wheel 104 in the axial direction. Engaging teeth 102a corresponding to the engaging teeth 104a project from an axial end surface of the input wheel 102. The engaging teeth 102a are engaged with the engaging teeth 104a when the input wheel 102 approaches the output wheel 104. In other words, the input wheel 102 is axially advanced to engage a part of the output wheel 104 in the circumferential direction and rotate in conjunction with the output wheel 104.

Further, a gear 102b is formed on an outer circumferential surface of the input wheel 102. The gear 102b is engaged with the input rack 56 (see FIG. 5) which is advanced and retracted with the second cylinder 16. Then, the engagement between the input rack 56 and the gear 102b allows the input wheel 12 to be rotated in response to the advancing or retracting motion of the second cylinder 16.

The actuator 100 moves the input wheel 102 forward and rearward along the axial direction. The actuator 100 is not limited to any specific configuration, and may be an air cylinder equipped with a piston 100a capable of axially extending and retracting as illustrated in FIG. 14. The input wheel 102 is rotatably mounted on the piston 100a via a bearing and other components. When the actuator 100 causes the input wheel 102 to advance, the input wheel 102 is engaged with the output wheel 104 in the circumferential direction. Through the engagement, the advancing or retracting motion of the second cylinder 16 is transmitted via the input wheel 102 and the output wheel 104 to the synchronization mechanism 32. On the other hand, when the actuator 100 causes the input wheel 102 to retract, the engagement between the input wheel 102 and the output wheel 104 is released. After the engagement is released, the advancing or retracting motion of the second cylinder 16 is no longer transmitted to the synchronization mechanism 32. It should be noted that engagement between the input rack 56 and the gear 102b is not released even though the input wheel 102 is moved to advance or retract.

In operation of the gripper device 10 in the example of FIG. 14, the first cylinder 14 is actuated in a state where the input wheel 102 is disengaged from the output wheel 104, to close the gripper claws 12 for holding the object therebetween. Then, when both of the gripper claws 12 make contact with the object, the first cylinder 14 is stopped. Immediately before or after the gripper claws 12 make contact with the object, the controller 18 operates the actuator 100 to move the input wheel 102 forward, and also operates the second cylinder 16 to extend in order to rotate the input wheel 102. In this way, the input wheel 102 approaches the output wheel 104 while rotating, so that the engaging teeth 102a and 104a are engaged with each other. Then, upon the engagement, the extending motion of the second cylinder 16 is transmitted through the input wheel 102, the output wheel 104, and the synchronization mechanism 32 to the gripper claws 12. As a result, a strong gripping force is given to the gripper claws 12, which can ensure that the object is firmly held by the gripper claws 12.

To release the gripping of the object, the controller 18 operates the actuator 100 to retract the input wheel 102. This releases the engagement between the input wheel 102 and the output wheel 104, which, in turn, disengages connection between the second cylinder 16 and the synchronization mechanism 32. In this state, the controller 18 may actuate the first cylinder 14 to open the gripper claws 12.

As is evident from the above explanation, also in the transmission mechanism 34 illustrated in FIG. 14, the gripper claws 12 are opened and closed by means of the first cylinder 14 having the long stroke and the small driving force, and the force of the second cylinder 16 having the short stroke and the strong driving force is transmitted to the gripper claws 12 only when the strong gripping force is needed. In this way, the gripper device 10 having a long stroke and a strong gripping force can be obtained without using an air cylinder which is large in size.

The above-described configurations are provided by way of illustration, while necessary configurations are to open and close the gripper claws 12 using the first cylinder 14 having the long stroke and the small driving force, and to transmit the force of the second cylinder 16 having the small stroke and the strong driving force to the gripper claws 12 only when the strong gripping force is needed. The configurations explained in this disclosure may be changed in ways other than the necessary configurations. For example, the first cylinder 14, which is placed outside the linearly moving body 42 in the above description, may be incorporated in the inside of the linearly moving body 42. With this configuration, the gripper device 10 can be further minimized in size.

Figure 15:
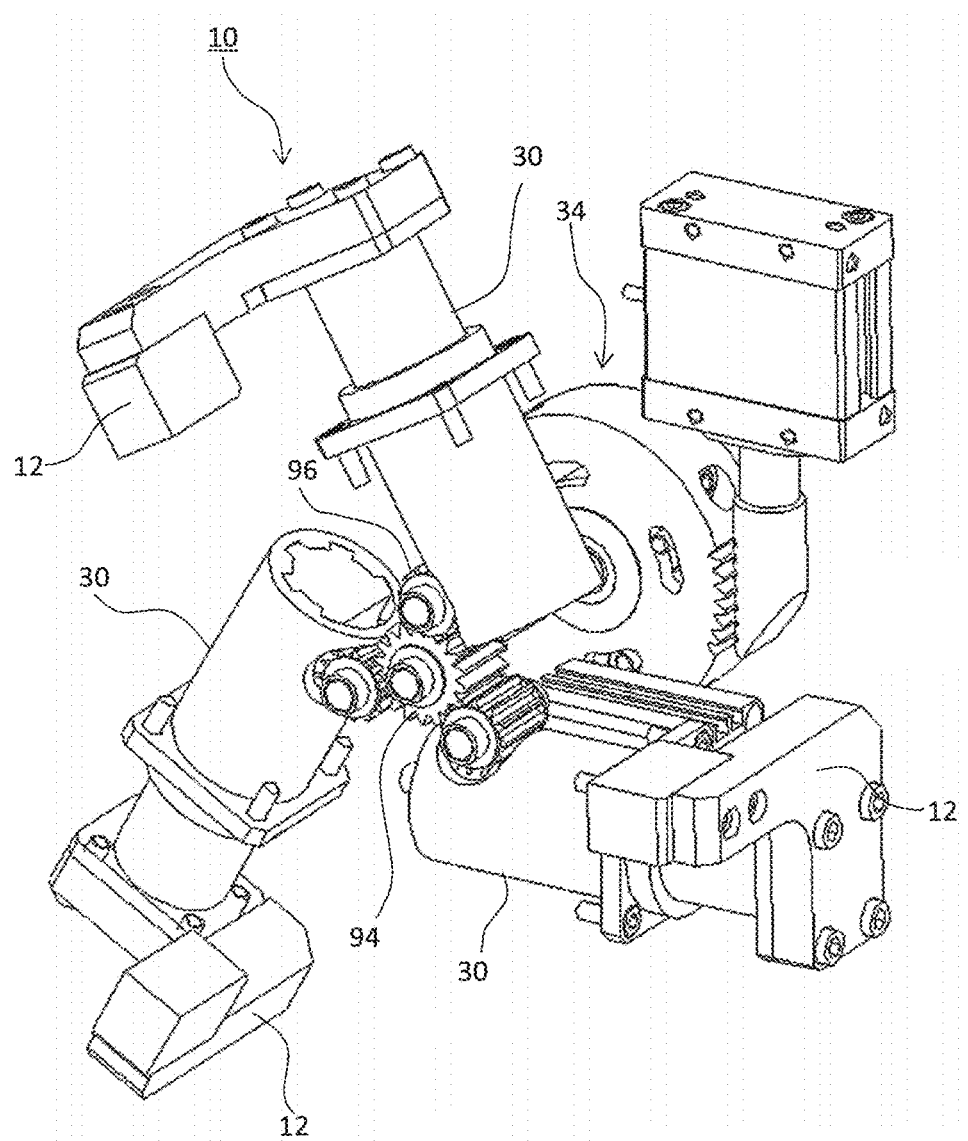
FIG. 15 is a perspective view of a gripper device equipped with a plurality of gripper claws.
Figure 16:
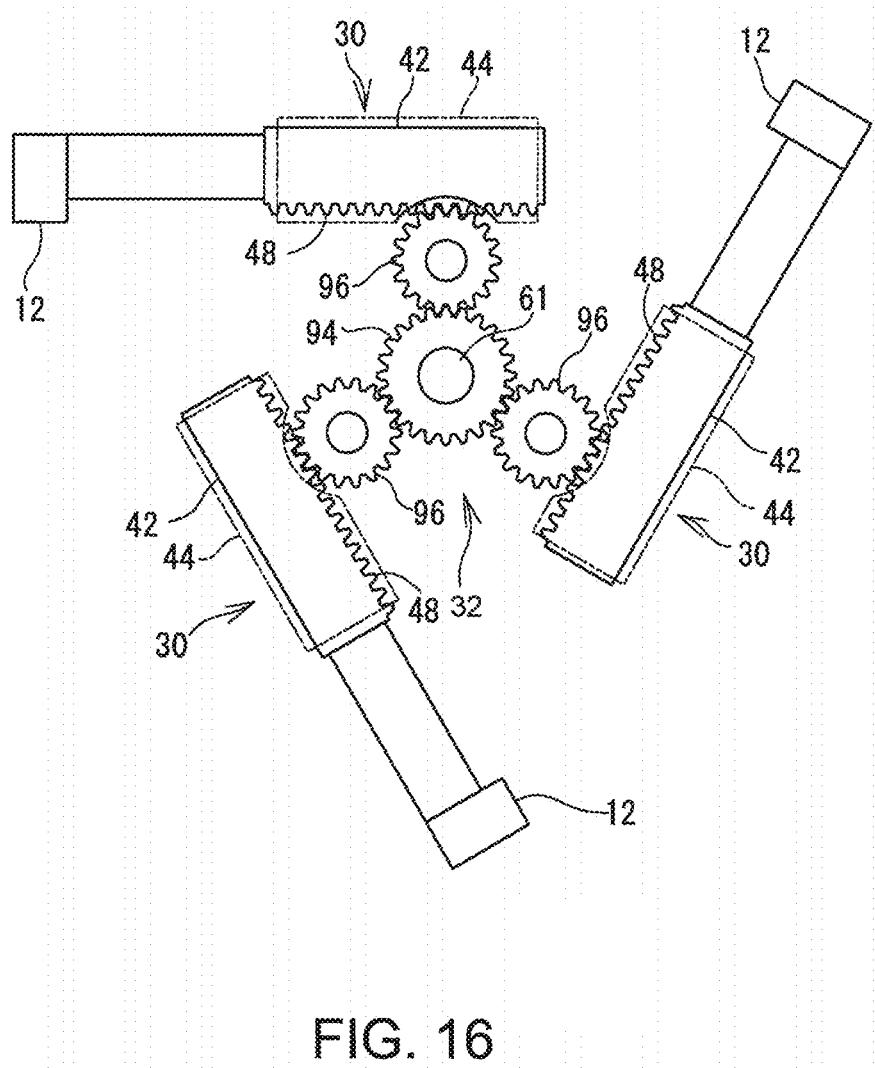
FIG. 16 shows a configuration of a synchronization mechanism installed in the gripper device of FIG. 15.

Although the examples have been explained with reference to the two gripper claws 12, the number of gripper claws 12 is not limited to two, and three or more gripper claws 12 may be installed. FIG. 15 is a perspective view of a gripper device 10 equipped with a plurality of gripper claws 12 (three gripper claws 12 in the illustrated example). FIG. 16 is a diagram showing a configuration of a synchronization mechanism 32 mounted in the gripper device 10 of FIG. 15. Taking the number of gripper claws 12 as N, the plurality of gripper claws 12 linearly approach toward or are linearly separated from each other along mutually different sides of a polygon composed of N sides. In the example of FIG. 15 in which the number of gripper claws 12 is three, the three gripper claws 12 linearly approach toward and are linearly separated from each other along mutually different sides of an equilateral polygon composed of three sides; i.e., an equilateral triangle. In addition, the gripper claws 12 are respectively coupled to the linear motion units 30, and each of the linear motion units 30 has the linearly moving body 42 (see FIG. 16) on which the claw rack 48 constituting a part of the synchronization mechanism 32 is formed.

Further, the synchronization mechanism 32 includes a first synchronization gear 94 disposed at the center of the equilateral polygon and three second synchronization gears 96. The first synchronization gear 94 is fixed to the output shaft 61 of the transmission mechanism 34 so as to be rotated with the output shaft 61. On the other hand, each of the second synchronization gears 96 is engaged with corresponding claw rack 48 and also with the first synchronization gear 94. The first and second synchronization gears 94 and 96 cooperatively function to synchronize movement of the gripper claws 12.

Meanwhile, the second cylinder 16 is configured, in the above description, to transmit its driving force to the gripper claws 12 while extending, although the second cylinder 16 may be configured the other way around. That is, the transmission mechanism 34 may be configured to transmit the driving force applied by the retracting motion of the second cylinder 16, and not to transmit the driving force applied by the extending motion of the second cylinder 16. Moreover, the first cylinder 14 may be coupled to the synchronization gear 50 rather than to the linearly moving body 42. In addition, the first and second cylinders 14 and 16 have been implemented by air cylinders which are pneumatically actuated, although hydraulic cylinders actuated by means of oil pressure may be employed as the first and second cylinders 14 and 16. Further, the transmission mechanism 34 is required to have the function of disengaging power transmission, while the components and functions of the transmission mechanism 34 other than the disengaging function may be modified as appropriate.

REFERENCE SIGNS LIST 10 gripper device, 12 gripper claw, 14 first cylinder, 16 second cylinder, 18 controller, 20 first cylinder drive unit, 22 second cylinder drive unit, 30 linear motion unit, 32 synchronization mechanism, 34 transmission mechanism, 40 front cover, 42 linearly moving body, 44 outer casing, 46 spline slot, 48 claw rack, 50 synchronization gear, 54 rear cover, 55 movable block, 56 input rack, 58 outer wheel, 60 inner wheel, 61 output shaft, 62 relay roller, 64 pocket, 66 cam surface, 68 cam hole, 70 spring plunger, 72 fixed pin, 76 first synchronization gear, 78 second synchronization gear, 80 swing lever, 82 ratchet pawl, 84 ratchet gear, 86 movable pin, 88 rotation shaft, 90 first cam hole, 92 second cam hole, 94 first synchronization gear, 96 second synchronization gear, 98 tooth, 100 actuator, 102 input wheel, 104 output wheel.

The invention claimed is:

1. A gripper device, comprising:
a plurality of gripper claws configured to be interlockingly movable with respect to each other;
a plurality of linear motion units, each of which is disposed on a corresponding one of the plurality of gripper claws;
a synchronization mechanism configured to synchronize movement of the plurality of linear motion units;
a first cylinder which is linearly extended and retracted by oil pressure or air pressure to apply a driving force of the first cylinder to the linear motion unit or the synchronization mechanism;
a second cylinder which is linearly extended and retracted by oil pressure or air pressure, and has a stroke shorter than a stroke of the first cylinder and a driving force greater than the driving force of the first cylinder; and
a transmission mechanism comprising a clutch configured to establish and release mechanical connection between the second cylinder and the synchronization mechanism.

2. The gripper device according to claim 1, wherein:
each of the plurality of linear motion units comprises a linearly moving body which is mechanically coupled to a corresponding one of the gripper claws; and
the synchronization mechanism comprises,
at least one claw rack disposed on the linearly moving body; and
at least one synchronization gear configured to engage the at least one claw rack.

3. The gripper device according to claim 2, wherein:
the transmission mechanism and the synchronization mechanism are configured to amplify the driving force of the second cylinder and transmit the amplified driving force to the linear motion unit.

4. The gripper device according to claim 1, wherein:
the clutch is a one-way clutch configured to engage the second cylinder with the synchronization mechanism to transmit the driving force of the second cylinder to the synchronization mechanism when the second cylinder is actuated to move linearly along a first direction, and to disengage the second cylinder from the synchronization mechanism when the second cylinder is actuated to move linearly along a second direction that is opposite the first direction.

5. The gripper device according to claim 4, wherein:
the transmission mechanism comprises a cam-type, one-way clutch that comprises
an outer wheel which is always coupled to the second cylinder and configured to be rotated by an extending or retracting motion of the second cylinder;
a pocket defined in an axial end surface of the outer wheel, the pocket having a peripheral surface designed to function as a cam surface;
an inner wheel which is always coupled to the synchronization mechanism, and is concentrically placed within the outer wheel in the pocket;
a relay roller disposed between the cam surface and the inner wheel and configured to be established in an engaged state where the relay roller is brought into intimate contact with both the cam surface and the inner wheel when the outer wheel is rotated along a first rotational direction and to be established in a disengaged state where the relay roller is separated from at least one of the cam surface and the inner wheel when the outer wheel is rotated along a second rotational direction which is opposite the first rotational direction; and
an urging member configured to urge the relay roller toward the engaged state.

6. The gripper device according to claim 4, wherein the transmission mechanism comprises a cam-type one-way clutch that comprises
an inner wheel which is always coupled to the second cylinder and configured to be rotated by an extending or retracting motion of the second cylinder;
a pocket defined in an axial end surface of the inner wheel, the pocket having a peripheral surface designed to function as a cam surface;
an outer wheel which is always coupled to the synchronization mechanism and concentrically placed around the inner wheel;
a relay roller disposed between the cam surface and the outer wheel, and configured to establish an engaged state where the relay roller is brought into intimate contact with both the cam surface and the outer wheel when the inner wheel is rotated along a first rotational direction and to establish a disengaged state where the relay roller is separated from at least one of the cam surface and the outer wheel when the inner wheel is rotated along a second rotational direction that is opposite the first rotational direction; and
an urging member configured to urge the relay roller toward the engaged state.

7. The gripper device according to claim 4, wherein the transmission mechanism comprises a ratchet-type, one-way clutch that comprises
a lever which is always coupled to the second cylinder and configured to be swung by an extending or retracting motion of the second cylinder;
a ratchet pawl which is coupled to the lever and configured to pivot in response to a swinging motion of the lever;
a ratchet gear which is always coupled to the synchronization mechanism for interlocked movement with the synchronization mechanism, and configured to be rotated when the ratchet pawl is pivoted along a first pivot direction and not to be rotated when the ratchet pawl is pivoted along a second pivot direction that is opposite the first pivot direction.

8. The gripper device according to claim 1, wherein the transmission mechanism comprises a dog clutch that comprises
- an output wheel which is always coupled to the synchronization mechanism for interlocked movement with the synchronization mechanism;
- an input wheel which is always coupled to the second cylinder and configured to be rotated by an extending or retracting motion of the second cylinder, wherein the input wheel is axially advanced to engage at least a part of the output wheel in a circumferential direction thereof; and
- an actuator configured to advance or retract the input wheel along an axial direction thereof.

9. The gripper device according to claim 1, wherein:
- the plurality of gripper claws comprise N gripper claws where N≥3;
- the N gripper claws are configured to be movable toward or away from each other along sides of a polygon which is composed of N sides;
- each of the plurality of linear motion units comprises a linearly moving body which is mechanically coupled to a corresponding one of the N gripper claws; and
- the synchronization mechanism comprises
  - a claw rack disposed on the linearly moving body, wherein the synchronization mechanism comprises N claw racks, and
  - a first synchronization gear disposed at a center of the polygon and configured to be directly or indirectly engaged with all of the N claw racks at the same time.

* * * * *